(12) United States Patent
Barke

(10) Patent No.: US 11,391,081 B2
(45) Date of Patent: Jul. 19, 2022

(54) METHODS, SYSTEMS, APPARATUSES AND DEVICES FOR FACILITATING MANAGEMENT OF A FACILITY

(71) Applicant: Eric Milton Barke, Prior Lake, MN (US)

(72) Inventor: Eric Milton Barke, Prior Lake, MN (US)

(*) Notice: Subject to any disclaimer, the term of this patent is extended or adjusted under 35 U.S.C. 154(b) by 696 days.

(21) Appl. No.: 16/251,405

(22) Filed: Jan. 18, 2019

(65) Prior Publication Data
US 2019/0234132 A1 Aug. 1, 2019

Related U.S. Application Data

(60) Provisional application No. 62/623,197, filed on Jan. 29, 2018.

(51) Int. Cl.
| | |
|---|---|
| *E05F 15/79* | (2015.01) |
| *G05B 19/418* | (2006.01) |
| *E05F 15/71* | (2015.01) |

(52) U.S. Cl.
CPC ............. *E05F 15/79* (2015.01); *E05F 15/71* (2015.01); *G05B 19/41865* (2013.01); *E05Y 2400/80* (2013.01)

(58) Field of Classification Search
CPC ...... E05F 15/71; E05F 15/79; E05Y 2400/80; G05B 15/02; G05B 19/41865; G05B 2219/2642
See application file for complete search history.

(56) References Cited

U.S. PATENT DOCUMENTS

| | | | |
|---|---|---|---|
| 2008/0046278 A1 | 2/2008 | Sanville et al. | |
| 2010/0206341 A1 | 8/2010 | Essenburg et al. | |
| 2013/0199585 A1 | 8/2013 | Petit | |
| 2019/0089934 A1* | 3/2019 | Goulden | .......... G08B 13/19684 |

FOREIGN PATENT DOCUMENTS

| | | |
|---|---|---|
| CN | 105549573 A | 5/2016 |
| WO | WO2013012345 A1 | 1/2013 |

* cited by examiner

*Primary Examiner* — Quan Zhen Wang
*Assistant Examiner* — Rajsheed O Black-Childress

(57) ABSTRACT

Disclosed herein is a system for facilitating management of a facility. Accordingly, the system may include a communication device configured for receiving at least one sensor data from at least one sensor corresponding to at least one door of the facility. Further, the communication device may be configured for transmitting at least one actuation data to at least one actuator corresponding to the at least one door. Further, the communication device may be configured for receiving at least one configuration data from a user device. Further, the system may include a processing device configured for analyzing the at least one sensor data to determine a current contextual data. Further, the processing device may be configured for comparing the current contextual data with the configuration data. Further, the processing device may be configured for generating the at least one actuation data based on the comparing.

16 Claims, 13 Drawing Sheets

METHODS, SYSTEMS, APPARATUSES AND DEVICES FOR FACILITATING MANAGEMENT OF A FACILITY

The current application claims a priority to the U.S. Provisional Patent application Ser. No. 62/623,197 filed on Jan. 29, 2018.

TECHNICAL FIELD

Generally, the present disclosure relates to the field of data processing. More specifically, the present disclosure relates to methods, systems, apparatuses and devices for facilitating management of a facility.

BACKGROUND

Automation of processes has become increasingly regular. Almost all commercial facilities make use of automation of processes, and mechanisms to improve and increase the productivity of the commercial business.

Currently, varieties of different systems that incorporate different technologies are used in automation. However, current systems are mostly equipped and focused towards automation of processes that are performed in a commercial facility. For instance, in a car wash facility, existing systems are only capable of automation and remotely controlling of the working of the car wash facility. Further, existing systems monitor environmental conditions (including weather conditions) near commercial facilities and automatically control the processes in the commercial facilities based on the weather conditions (including temperature).

However, existing systems do not include closing the doors of a commercial facility at night based on certain pre-set factors, and conditions. Further, existing systems do not automate the door timers of commercial facilities and closing doors of the commercial facility when certain pre-set conditions may have been met. Further, existing systems, do not include the feature of sending alerts to a user about any pre-set condition to control the doors of a commercial facility being met and closing the doors of the commercial facility simultaneously.

Further, existing systems do not include the feature of controlling the automation of opening and closing of doors of a commercial facility, and other connected mechanisms inside the facility.

Further, existing systems do not include the feature of analyzing the pre-set conditions and/or parameters to control the automation of doors of a commercial facility and suggesting default parameters, and settings to control the automation of doors of a commercial facility based on the analysis.

Further, existing systems do not include the feature of suggesting conditions, and parameters based on a change in external factors, including a change in the season, or a change in the working of the commercial facility.

Further, existing systems do not suggest a change in parameters, and conditions to control the automation of doors of a commercial facility based on the actual parameters when the doors of the commercial facility may be controlled, and opened and closed.

Further, existing systems do not include the feature of changing the parameters based on an interaction between connected user devices, and the systems.

Therefore, there is a need for improved methods, systems, apparatuses and devices for facilitating management of a facility that may overcome one or more of the above-mentioned problems and/or limitations.

BRIEF SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method of facilitating management of a facility, in accordance with some embodiments. Accordingly, the method may include a step of receiving, using a communication device, at least one sensor data from at least one sensor corresponding to at least one door of the facility. Further, the method may include a step of transmitting, using the communication device, at least one actuation data to at least one actuator corresponding to the at least one door. Further, the method may include a step of receiving, using the communication device, at least one configuration data from a user device. Further, the method may include a step of analyzing, using a processing device, the at least one sensor data to determine a current contextual data. Further, the method may include a step of comparing, using the processing device, the current contextual data with the configuration data. Further, the method may include a step of generating, using the processing device, the at least one actuation data based on the comparing. Further, the method may include a step of storing, using a storage device, the configuration data.

Further disclosed herein is a system for facilitating management of a facility, in accordance with some embodiments. Accordingly, the system may include a communication device configured for receiving at least one sensor data from at least one sensor corresponding to at least one door of the facility. Further, the communication device may be configured for transmitting at least one actuation data to at least one actuator corresponding to the at least one door. Further, the communication device may be configured for receiving at least one configuration data from a user device. Further, the system may include a processing device configured for analyzing the at least one sensor data to determine a current contextual data. Further, the processing device may be configured for comparing the current contextual data with the configuration data. Further, the processing device may be configured for generating the at least one actuation data based on the comparing. Further, the system may include a storage device configured to store the configuration data.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

Figure 1:
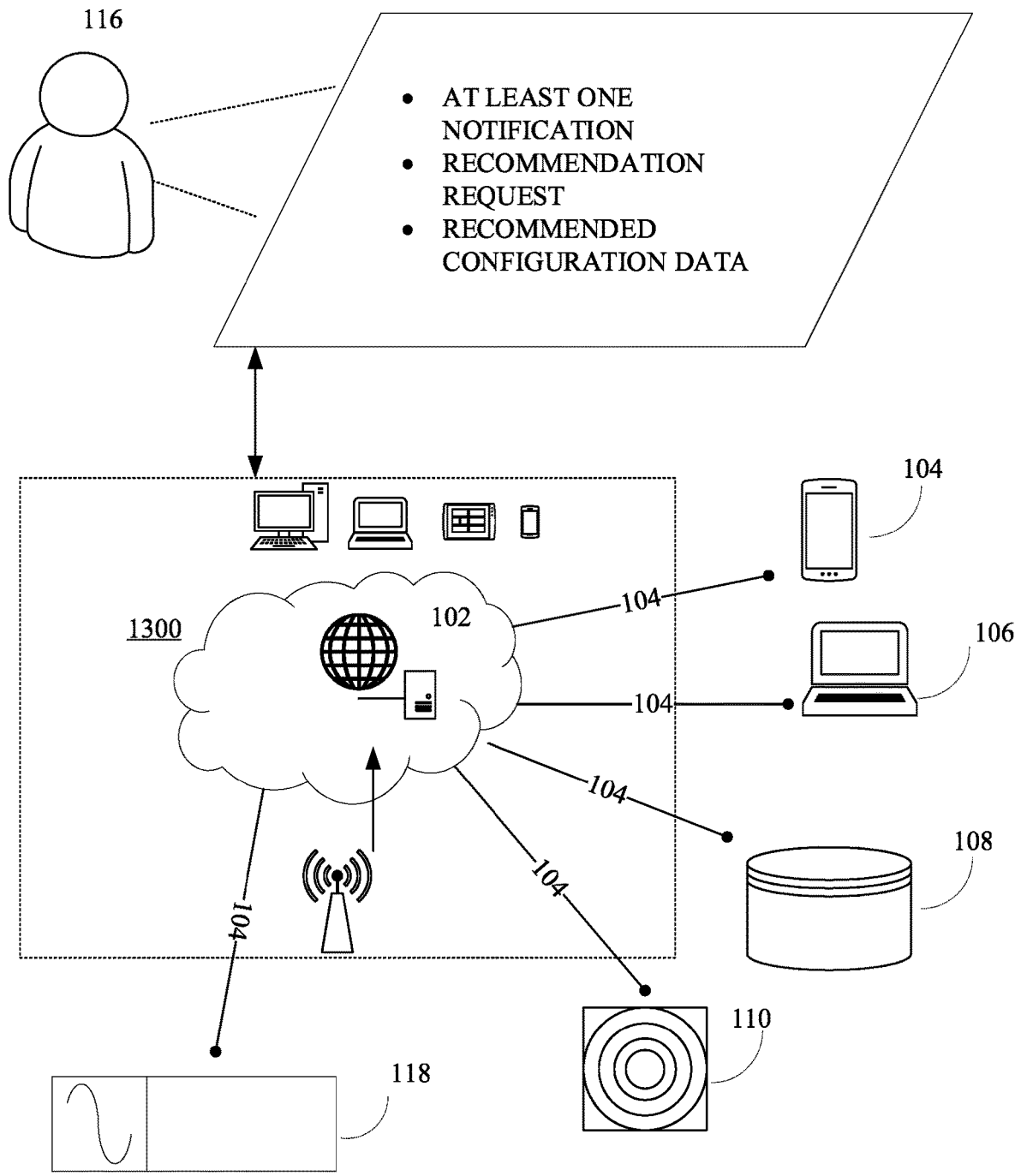
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of management of a facility, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

FIG. 1 is an illustration of an online platform 100 consistent with various embodiments of the present disclosure. By way of non-limiting example, the online platform 100 to facilitate management of a facility may be hosted on a centralized server 102, such as, for example, a cloud computing service. The centralized server 102 may communicate with other network entities, such as, for example, a mobile device 104 (such as a smartphone, a laptop, a tablet computer etc.), other electronic devices 106 (such as desktop computers, server computers etc.), databases 108, relays 118, and sensors 110 and actuators (not shown) over a communication network 104, such as, but not limited to, the Internet. Further, users of the online platform 100 may include relevant parties such as, but not limited to, end users, administrators, service providers, service consumers and so on. Accordingly, in some instances, electronic devices operated by the one or more relevant parties may be in communication with the platform.

A user 116, such as the one or more relevant parties, may access online platform 100 through a web based software application or browser. The web based software application may be embodied as, for example, but not be limited to, a website, a web application, a desktop application, and a mobile application compatible with a computing device 1300.

According to some embodiments, the online platform 100 may be configured to communicate with a system to facilitate management of a facility. Further, the management of the facility, in an instance, may include an automation of opening and/or closing of doors and/or windows. Further, the opening and/or closing of doors may be performed when certain parameters may have been fulfilled or certain conditions may have been met. The conditions or parameters may have been set by a user. For instance, the doors of a commercial facility may close automatically at night, and re-open in the morning. Further, in another instance, the doors of the commercial facility may lock (and/or unlock) automatically based on the conditions or parameters set by the user. Further, the system may include the automatic activation and deactivation of other mechanisms that may be connected. For instance, a commercial facility may include escalators or elevators, that may be activated, or deactivated based on some pre-set parameters. Further, the system may include a user device. The user device may be a mobile device such as, but not limited to, a smartphone, or a computer tablet, or a computing device like a personal computer, or a laptop. The user device may include a communication device configured to communicate over a communication network such as, but not limited to, a cellular network, a satellite network, a personal area network, Bluetooth, Internet and so on. Further, the user device may include sensors. The sensors may include, but may not be limited to a GPS sensor. The sensors may be used to record the location of the user. The user device may be used by a user to set the parameters, and conditions that may enable the doors and other connected mechanisms to open, and close. Further, the user device may be used by the user to control the opening and closing of the doors, and the activation, or deactivation of any other connected components. Further, the user device may be used by the user to monitor the components connected to enable the automation of opening, and closing of doors, and the activation and deactivation of other connected components.

Accordingly, the system may allow users to register and create user profiles on the online platform 100. For instance, the user profiles created may include business owner profiles, customer profiles, and business owner profiles linked with customer profiles. The system may also include a companion application that customers may control from connected user devices to try to influence the system to facilitate automation of opening and closing of doors in commercial facilities.

Further, the system may include other components, such as actuators, and relays, that may be used to control the working of the doors. Further, the system may include sensors to record and monitor the ambient conditions near the commercial facility where the system may be installed to facilitate the automation of opening and closing of doors. The sensors may include, but may not be limited to a GPS sensor, a temperature sensor, a wind speed sensor, and a humidity sensor.

A user may configure components of the system to automate the opening and closing of the doors of a commercial facility. Further, additionally connected mechanisms, such as escalators, and elevators may also be configured to be automatically activated and deactivated. The automation of all the connected mechanisms, including the automation of opening, and closing may be based on various factors that may have been preset by the user. For instance, the user may configure the doors of the commercial facility to close (or lock/unlock) automatically at night, at a particular time, and open again in the morning, at a particular time. The user may be the administrator or owner of the commercial facility.

Further, the connected sensors may always be active and may collect data continuously. The sensors may include, but may not be limited to a GPS sensor, a temperature sensor, a wind speed sensor, and a humidity sensor. Accordingly, the sensors may sense data such as temperature, wind speed, and humidity. The sensors may continue to monitor designated parameters, and transmit the monitored parameters. Further, the data received from the connected sensors may be analyzed. The received data may be compared against parameters that may have been preset by the user. Accordingly, the comparisons between pre-set conditions and monitored parameters may be used to determine whether the conditions that may have been preset by the user have been fulfilled. For instance, the commercial facility may be a car wash or auto-body shop. Accordingly, the owner of the car wash or auto-body shop may have pre-set a minimum temperature below which the doors of the car wash or auto-body shop may close and a door timer may be enabled. Further, if the conditions that pre-set by the user are determined to be fulfilled, the connected actuators and relays may be used to close the doors of the commercial facility.

In further embodiments, the user may monitor the connected doors and additional mechanisms through the user device. The user may be able to view the status of the connected doors and additional mechanisms. The status of the connected doors and additional mechanisms may represent whether the mechanism is active or not. For instance, the status of a door of a commercial facility may include whether the door is open or closed.

In further embodiments, the user may also receive a notification through the user device if the status of a door or additional mechanism is against the pre-set parameters. For instance, if the user sets the doors of a commercial facility to be open after 8 am, and a door remains closed, a notification may be sent to the user device notifying the user of the same. Accordingly, the user may set a buffer time for which the status of the door or additional mechanisms may be monitored before sending a notification. For instance, if the doors of a commercial facility remain closed even after the user has set the doors to be open, the status of the closed doors may be monitored for 5 minutes before a notification is sent to the user device.

In further embodiments, the user may set multiple parameters to automate the opening and closing of doors. For instance, the user may automate the doors to close at a particular time at night and open at a pre-set time in the morning. Further, the user may have also set a temperature limit. The doors of the commercial facility may close if the ambient temperature rises, and falls beyond a certain pre-defined range. Further, apart from the temperature, the doors may be set to close if the wind speed, or the ambient relative humidity increases or decreases beyond a certain pre-defined range. The opening and closing of doors may depend on all of the factors. However, the doors may open, and close even if any one of the conditions is fulfilled. For instance, the doors may close at night, and open in the morning, regardless of the temperature, wind speed, and relative humidity. Further, in another instance, the doors may close if the temperature falls beyond the pre-set range regardless of the time of day, and also the wind speed, and the humidity. Therefore, all the pre-set parameters may be analyzed in conjunction to determine the opening and closing of doors. Further, the user may receive a notification on the user device, notifying about a particular parameter being met. Accordingly, the user may choose to open or close (and/or lock/unlock) the doors through a remote control.

In further embodiments, the parameters stored by the user to control the opening and closing of doors, and the activation, and de-activation of additional mechanisms may be stored on a database hosted on the online platform 100. The parameters may include specific temperature values, specific times, and other conditions that may regulate, and control the opening, and closing of doors, and activation and deactivation of connected mechanisms. Additionally, these parameters may be stored in conjunction with contextual data. The contextual data may include the type of commercial facility and the location of the commercial facility. Further, the contextual data may also include the data related to the profile of the business owner, or administrator, including, but not limited to the age, and gender of the business owner or administrator.

Further, the stored parameters may be analyzed and a default set of parameters and conditions may be suggested for a particular system upon analysis. Further, other connected databases, such as websites hosted on the internet may be accessed and analyzed to determine a set of default conditions. For instance, if the system is a greenhouse, an environment inside the greenhouse may be highly controlled. Accordingly, the time of opening and closing of doors, and other connected mechanisms (such as mechanisms to control irrigation, and water supply to plants and crops) may be controlled and may be different based upon the type of plants being grown, and the season. Accordingly, additional databases (such as websites hosted) may be accessed, and analyzed, and a default set of parameters (including the temperature, and times at which the doors of the greenhouse may open, and close) and the temperature, time, and other parameters when the additional connected mechanisms (including the mechanisms to control the irrigation) may activate or deactivate may be suggested.

In further embodiments, the parameters, and conditions to control the opening, and closing of doors may differ from the actual parameters that a user may be monitoring to open and close the doors and control the connected mechanisms manually. For instance, the commercial facility may be a store. The user may have set certain times to open and close the doors automatically, for e.g. the user may have set the doors to automatically open at 8 am and close at 9 pm. However, the user may be manually opening, and closing the doors of the store at times different to the ones set to automatically open and close the doors. For e.g. the user may be opening the doors of the store at 7 am and closing the doors at 3:30 pm. Further, the user may close the store early if the outside temperature reduces to less than 5° C. The manual opening and closing of the doors may be analyzed, and accordingly, a new set of default parameters (that may incorporate the parameters and conditions that the user may be following while opening, and closing the doors) may be suggested to the user through the user device.

In further embodiments, a user device, other than the user device may be used to control the automation of doors and other connected mechanisms. For instance, the commercial facility may be a car wash. A user (user 1) who may be the business owner or administrator may have configured the system to open the doors of the car wash for a certain amount of time. Further, the user 1 may have set the connected mechanisms such as the mechanisms to wash cars to activate and deactivate after a certain amount. Another user (user 2) may be a customer of the car wash and may have registered a profile on the online platform 100. The user 2 may be aged and may have difficulty in operating his car, or any other mechanisms. Further, the age of the user 2 may be saved on the profile registered on the online platform 100. Therefore, when the user 2 may arrive at the car wash, the user 2 may connect to the system through a user interface, over a communication network, such as Bluetooth. The online platform 100 may analyze the profile parameters, including the age of the user 2, and configure the system to increase the time span within which the mechanisms may remain active.

In further embodiments, the doors separating different sections of a commercial facility, along with the mechanisms in the different sections may be monitored and analyzed to determine the presence of a user in the different sections. Further, the automation of opening and closing of doors may be automated based on the presence of a user in the particular section. For instance, in a car wash, a user takes a vehicle into a self-serve wash bay, the presence of the user may be determined. Further, another user may be present outside the self-serve wash bay and may be waiting to get into the self-serve wash bay. Accordingly, the mechanisms in the self-serve wash bay may be monitored, and the door to exit the self-serve wash bay may open automatically after the completion of the self-serve wash. Further, the door to the self-serve wash bay may automatically open as soon as the user using the self-serve wash bay exits from an exit door. Further, the opening and closing of the doors, along with the status of the self-serve wash bay may be displayed through a connected electronic signboard and may be used to display whether the self-serve wash bay is open, or full.

Figure 2:
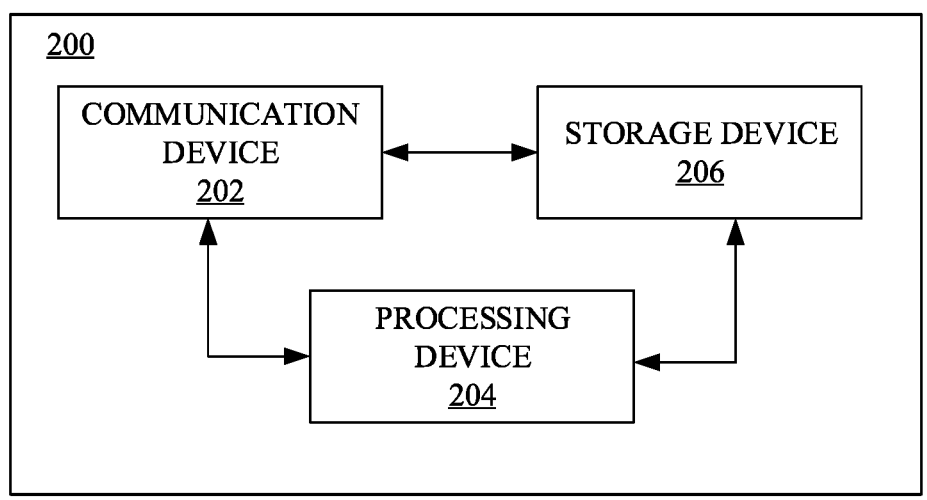
FIG. 2 illustrates a system to facilitate management of a facility, in accordance with some embodiments.

FIG. 2 illustrates a system 200 to facilitate management of a facility, in accordance with some embodiments. Accordingly, the facility, in an instance, may be any physical space where a control for opening and/or closing of one or more mechanisms (such as doors, windows, valves etc.) may be required. The facility, in an instance, may include, but not limited to, a car wash center, a hospital, an office, a restaurant, a school, a building etc. Further, the management of the facility, in an instance, may include an automation of opening and/or closing of doors and/or windows.

The system 200 may include a communication device 202 configured for receiving at least one sensor data from at least one sensor corresponding to at least one door of the facility. Further, the at least one sensor data, in an instance, may be any data that may be sensed by the at least one sensor. In an instance, the at least one sensor may be any sensor device that may be embedded near and/or within the at least one door of the facility. Further, the at least one sensor may include, but not limited to, a position sensor, a motion sensor, a light sensor, an infra-red sensor, an ultrasonic sensor, a location sensor etc. Further, the at least one door may include (but not limited to) a sliding door, a swing door, an industrial door, a secured entry door etc. Further, the at least one door may be configured to control physical access to the facility based on at least one state of the at least one door. Further, the at least one state may include one of an open state and a closed state. Further, the open state of the at least one door, in an instance, may be any state that may allow physical access to the facility through the at least one door. Further, the closed state of the at least one door, in an instance, may be any state that may block any physical access to the facility through the at least one door. In some embodiments, the facility may include at least one equipment. For instance, in the facility (such as a restaurant), the at least one equipment may include mechanisms and/or devices that may be used in the restaurant. The at least one equipment, in an instance, may include (but not limited to) an air-conditioner that may be placed within the facility (such as the restaurant). Further, the at least one sensor may include at least one equipment sensor associated with the at least one equipment. Further, the at least one equipment sensor, in an instance, may be any sensor that may be embedded within and/or near the at least one equipment. For instance, the at least one equipment sensor may include (but not limited to) a temperature sensor. Further, an equipment sensor associated with an equipment may be configured for sensing an operational state of the equipment. The operational state of the equipment, in an instance, may be any state that may reflect working of the equipment. For instance, the equipment sensor (such as the temperature sensor) associated with the equipment (such as the air-conditioner) may be configured to sense the operational state of the equipment (such as cooling state, and/or heating state for the air conditioner). Further, the communication device 202 may be configured for transmitting at least one actuation data to at least one actuator corresponding to the at least one door. The at least one actuator, in an instance, may be any device that may be configured to physically control a movement (such as opening and/or closing) associated with the at least one door. Further, the at least one actuator may be configured to control the at least one state. Further, in some embodiments, the at least one actuator may be configured to control an operational state of the at least one equipment. Further, the communication device 202 may be configured for receiving at least one configuration data from a user device. Further, the configuration data may include indication of at least one contextual condition and at least one action corresponding to the at least one contextual condition. The at least one configuration data, in an instance, may include contextual condition such as specific temperature values, specific times, and/or other conditions that may result in at least one action (such as regulate, and/or control the opening, and closing of doors, and activation and deactivation of connected mechanisms etc.) corresponding to the at least one contextual condition. Further, in some embodiments, the at least one action corresponds to controlling the operational state of the at least one equipment.

Further, the system 200 may include a processing device 204 configured for analyzing the at least one sensor data to determine a current contextual data. Further, the current contextual data, in an instance, may include a type of the facility and/or a location associated with the facility. Further, the current contextual data, in an instance, may also include the data related to a profile of the user (such as a business owner, or administrator), including, but not limited to the age, and gender of the business owner or administrator. Further, the processing device 204 may be configured for comparing the current contextual data with the configuration data. Further, the processing device 204 may be configured for generating the at least one actuation data based on the comparing. Further, the system 200 may include a storage device 206 configured to store the configuration data.

In further embodiments, the at least one sensor may include at least one door sensor associated with the at least one door. Further, a door sensor associated with a door may be configured for sensing a state of the door. The door sensor may include sensor devices such as (but not limited to) a position sensor, a motion sensor, a light sensor, an infra-red sensor, an ultrasonic sensor etc. associated with the door. Further, the processing device 204 may be configured for generating at least one notification based on the comparing. The at least one notification, in an instance, may be an alert that may be given to the user through the user device. Further, the at least one notification, in an instance, may include (but not limited to) an email, and/or a message that may be used to alert the user based on the comparing. Further, the communication device 202 may be configured for transmitting the at least one notification to the user device. In an instance, the user may receive the at least one notification through the user device if a status (such as a door open status, and/or a door closed status) of a door or additional mechanism is against a pre-set parameter and/or condition. For instance, if the user sets the doors of a commercial facility to be open after 8 am, and a door remains closed, a notification may be sent to the user device notifying the user of the same.

In further embodiments, the configuration data may include a buffer time indication. Accordingly, the user may set the buffer time indication for which the status of the door or additional mechanisms may be monitored before sending the at least one notification. Further, the processing device 204 may be configured for generating the at least one notification based on the buffer time indication. Further, the at least one sensor data associated with the at least one door sensor corresponds to the buffer time. For instance, if the doors of a commercial facility remain closed even after the user has set the doors to be open, the status of the closed doors may be monitored for 5 minutes before a notification is sent to the user device.

In further embodiments, the at least one sensor may include a user characteristic sensor configured for sensing at least one user characteristic data of at least one user of the facility. The user characteristic sensor, in an instance, may be any sensor device (such as, but not limited to, a camera sensor, a biometric sensor etc.) that may be configured to sense the at least one user characteristic data of the at least one user of the facility. Further, the at least one user characteristic data, in an instance, may be any data that may reflect any feature associated with the at least one user. For instance, the at least one user characteristic data may include (but not limited to) biometric data (such as fingerprint, palm veins, palm print, face recognition, DNA, hand geometry, iris recognition, retina, voice, odor/scent etc.), age, gender, and so on. Further, the indication of the at least one contextual condition may include the at least one user characteristic data.

Further, in some embodiments, the storage device 206 may be configured to store historical data including the at least one sensor data corresponding to a first time period and at least one state data associated with the at least one door corresponding to the first time period. Accordingly, the historical data, in an instance, may be any data that may reflect the at least one state data (such as an open state, and/or a closed state associated with a door) corresponding to the first time period (such as a previous month, a previous week, and/or a first week of current month etc.) Further, the processing device 204 may be configured for analyzing the historical data. Further, the processing device 204 may be configured for generating recommended configuration data based on the analyzing of the historical data. In an instance, the recommended configuration data may include a suggestion with regard to a time for opening and/or closing the doors of the facility (such as the restaurant) based on the historical data (such as the at least one sensor data collected from previous month). For instance, the recommended configuration data may include a suggestion such as changing a door opening time from 9 AM to 8 AM and a door closing time from 7 PM to 6 PM based on the historical data. Further, the communication device 202 may be configured for receiving a recommendation request from the user device. Further, the recommendation request, in an instance, may be an appeal from the user through the user device to provide the recommended configuration data. Further, the communication device 202 may be configured for transmitting the recommended configuration data to the user device based on the recommendation request. Further, the recommended configuration data may include the configuration data. Further, the current contextual data may be based on the at least one sensor data corresponding to a second time period. Further, the second time period may be later than the first time period.

In further embodiments, the facility may include a first facility and a second facility. The first facility and the second facility, in an instance, may be two different facilities that may be located at different locations. Further, the historical data corresponds to the first facility associated with a first facility characteristic data. The first facility characteristic data, in an instance, may be any data that may reflect features associated with the first facility. For instance, the first facility characteristic data may include data such as (but not limited to) time associated with the opening and/or closing of doors at the first facility etc. Further, the communication device 202 may be configured for receiving the first facility characteristic data and a second facility characteristic data associated with the second facility. The second facility characteristic data, in an instance, may be any data that may reflect features associated with the second facility. For instance, the second facility characteristic data may include data such as (but not limited to) time associated with the opening and/or closing of doors at the second facility etc. Further, the processing device 204 may be configured for matching the first facility characteristic data with the second facility characteristic data. Further, the generating of the recommended configuration data that may be based on the matching.

In further embodiments, the at least one sensor may include at least one facility characteristic sensor configured for sensing one or more of the first facility characteristic data and the second facility characteristic data. The at least one facility characteristic sensor, in an instance, may include a sensor such as (but not limited to) a temperature sensor, a pressure sensor, a camera sensor, a location sensor, a humidity sensor etc.

In further embodiments, the recommendation request may include the second facility characteristic data. Further, the processing device 204 may be configured for generating at least one search query based on the second facility characteristic data. The at least one search query, in an instance, may be any inquiry and/or question that may be asked by the user through the user device. Further, the processing device 204 may be configured for processing at least one search result. Further, the at least one search result, in an instance, may be a response associated with the at least one search query. Further, the processing device 204 may be configured for identifying the first facility characteristic data based on the processing of the at least one search result. Further, the generating of the recommended configuration data may be based on the at least one search result. Further, the communication device 202 may be configured for transmitting the at least one search query to an external database. Further, the external database, in an instance, may be any storage space that may be configured to store the at least one search result in an organized form that may be accessed electronically. Further, the communication device 202 may be configured for receiving the at least one search result from the external database.

Further, the system 200, in an instance, may be a kind of set it and forget it type of system for facilities such as a car wash industry, green houses, and automotive shops/warehouses etc.

Figure 3:
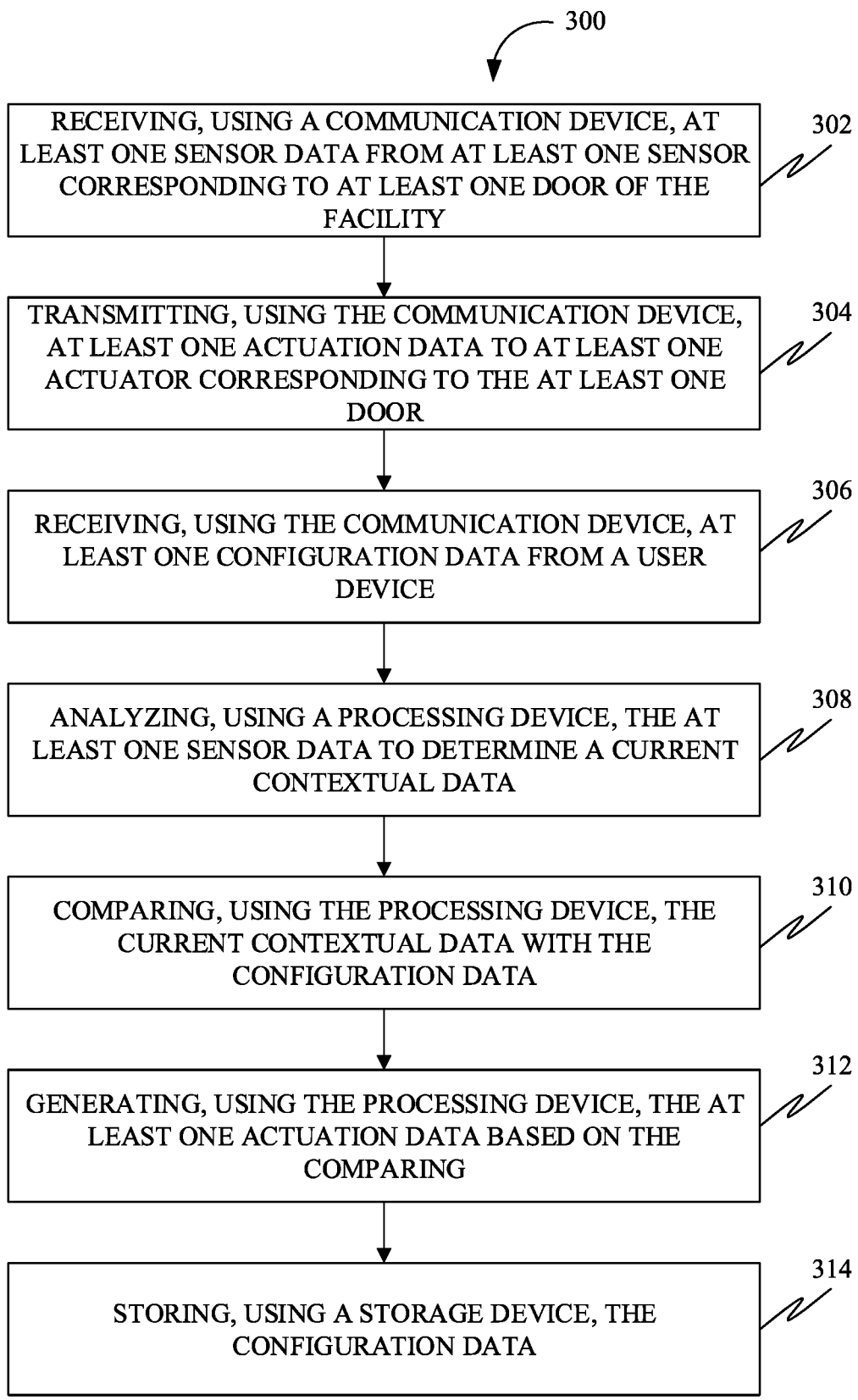
FIG. 3 is a flowchart of a method to facilitate management of a facility, in accordance with some embodiment.

FIG. 3 illustrates a method 300 to facilitate management of a facility, in accordance with some embodiment. Accordingly, the facility, in an instance, may be any physical space where a control for opening and/or closing of one or more mechanism (such as doors, windows, valves etc.) may be required. The facility may include, but not limited to, a car wash center, a hospital, an office, a restaurant, a school, a building, a green house, an automotive shop/warehouse etc. Further, the management of the facility, in an instance, may include an automation of opening and/or closing of doors and/or windows.

Further, at 302, the method 300 may include receiving, using a communication device, at least one sensor data from at least one sensor corresponding to at least one door of the facility. Further, the at least one sensor data, in an instance, may be any data that may be sensed by the at least one sensor. In an instance, the at least one sensor may be any sensor device that may be embedded near and/or within the at least one door of the facility. Further, the at least one sensor may include, but not limited to, a position sensor, a motion sensor, a light sensor, an infra-red sensor, an ultrasonic sensor, a location sensor etc. Further, the at least one door may include (but not limited to) a sliding door, a swing door, an industrial door, a secured entry door etc. Further, the at least one door may be configured to control physical access to the facility based on at least one state of the at least one door. Further, the at least one state may include one of an open state and a closed state. Further, the open state of the at least one door, in an instance, may be any state that may allow physical access to the facility through the at least one door. Further, the closed state of the at least one door, in an instance, may be any state that may block any physical access to the facility through the at least one door. Further, in some embodiments, the facility may include at least one equipment. For instance, in the facility (such as a restaurant), the at least one equipment may include mechanisms and/or devices that may be used in the restaurant. The at least one equipment, in an instance, may include (but not limited to) an air-conditioner that may be placed within the facility (such as the restaurant). In some embodiments, the at least one sensor may include at least one equipment sensor associated with the at least one equipment. Further, the at least one equipment sensor, in an instance, may be any sensor that may be embedded within and/or near the at least one equipment. For instance, the at least one equipment sensor may include (but not limited to) a temperature sensor. Further, an equipment sensor associated with an equipment may be configured for sensing an operational state of the equipment. The operational state of the equipment, in an instance, may be any state that may reflect working of the equipment. For instance, the equipment sensor (such as a temperature sensor), associated with the equipment (such as the air-conditioner), may be configured to sense the operational state of the equipment (such as cooling state, and/or heating state for the air conditioner).

Further, at 304, the method 300 may include transmitting, using the communication device, at least one actuation data to at least one actuator corresponding to the at least one door. The at least one actuator, in an instance, may be any device that may be configured to physically control a movement (such as opening and/or closing) associated with the at least one door. Further, the at least one actuator may be configured to control the at least one state. Further, in some embodiments, the at least one actuator may be configured to control an operational state of the at least one equipment.

Further, at 306, the method 300 may include receiving, using the communication device, at least one configuration data from a user device. Further, the configuration data may include indication of at least one contextual condition and at least one action corresponding to the at least one contextual condition. The at least one configuration data, in an instance, may include contextual condition such as specific temperature values, specific times, and/or other conditions that may result in at least one action (such as regulate, and/or control the opening, and closing of doors, and activation and deactivation of connected mechanisms etc.) corresponding to the at least one contextual condition. Further, in some embodiments, the at least one action corresponds to controlling the operational state of the at least one equipment. Further, in some embodiments, the at least one sensor may include a user characteristic sensor configured for sensing at least one user characteristic data of at least one user of the facility. The user characteristic sensor, in an instance, may be any sensor device (such as, but not limited to, a camera sensor, a biometric sensor etc.) that may be configured to sense the at least one user characteristic data of the at least one user of the facility. Further, the at least one user characteristic data, in an instance, may be any data that may reflect any feature associated with the at least one user. For instance, the at least one user characteristic data may include (but not limited to) biometric data (such as fingerprint, palm veins, palm print, face recognition, DNA, hand geometry, iris recognition, retina, voice, odor/scent etc.), age, gender, and so on. Further, the indication of the at least one contextual condition may include the at least one user characteristic data.

Further, at 308, the method 300 may include analyzing, using a processing device, the at least one sensor data to determine a current contextual data. Further, the current contextual data, in an instance, may include a type of the facility and/or a location associated with the facility. Further, the current contextual data, in an instance, may also include the data related to a profile of the user (such as a business owner, or administrator), including, but not limited to the age, and gender of the business owner or administrator.

Further, at 310, the method 300 may include comparing, using the processing device, the current contextual data with the configuration data.

Further, at 312, the method 300 may include generating, using the processing device, the at least one actuation data based on the comparing.

Further, at 314, the method 300 may include storing, using a storage device, the configuration data. Further, the storing may include storing historical data including the at least one sensor data corresponding to a first time period and at least one state data associated with the at least one door corresponding to the first time period. Accordingly, the historical data, in an instance, may be any data that may reflect the at least one state data (such as an open state, and/or a closed state associated with a door) corresponding to the first time period (such as a previous month, a previous week, and/or a first week of current month etc.)

Figure 4:
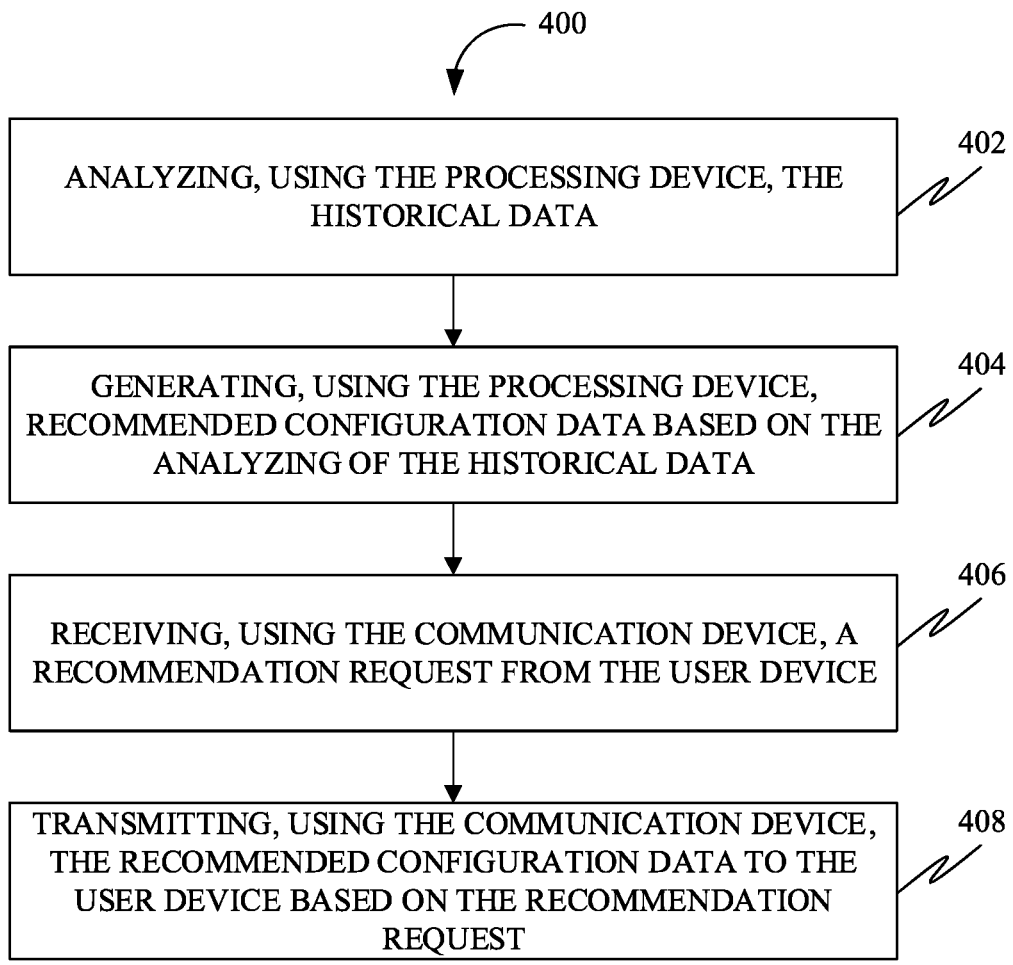
FIG. 4 is a flowchart of a method to facilitate providing recommended configuration data, in accordance with further embodiments.

FIG. 4 is a flowchart of a method 400 to facilitate providing recommended configuration data, in accordance with further embodiments. Further, at 402, the method 400 may include analyzing, using the processing device, the historical data.

Further, at 404, the method 400 may include generating, using the processing device, recommended configuration data based on the analyzing of the historical data. In an instance, the recommended configuration data may include a suggestion with regard to a time for opening and/or closing the doors of the facility (such as the restaurant) based on the historical data (such as the at least one sensor data collected from previous month). For instance, the recommended configuration data may include a suggestion such as changing a door opening time from 9 AM to 8 AM and a door closing time from 7 PM to 6 PM based on the historical data.

Further, at 406, the method 400 may include receiving, using the communication device, a recommendation request from the user device. Further, the recommendation request, in an instance, may be an appeal from the user through the user device to provide the recommended configuration data.

Further, at 408, the method 400 may include transmitting, using the communication device, the recommended configuration data to the user device based on the recommendation request. Further, the recommended configuration data may include the configuration data. Further, the current contextual data may be based on the at least one sensor data corresponding to a second time period. Further, the second time period may be later than the first time period.

Figure 5:
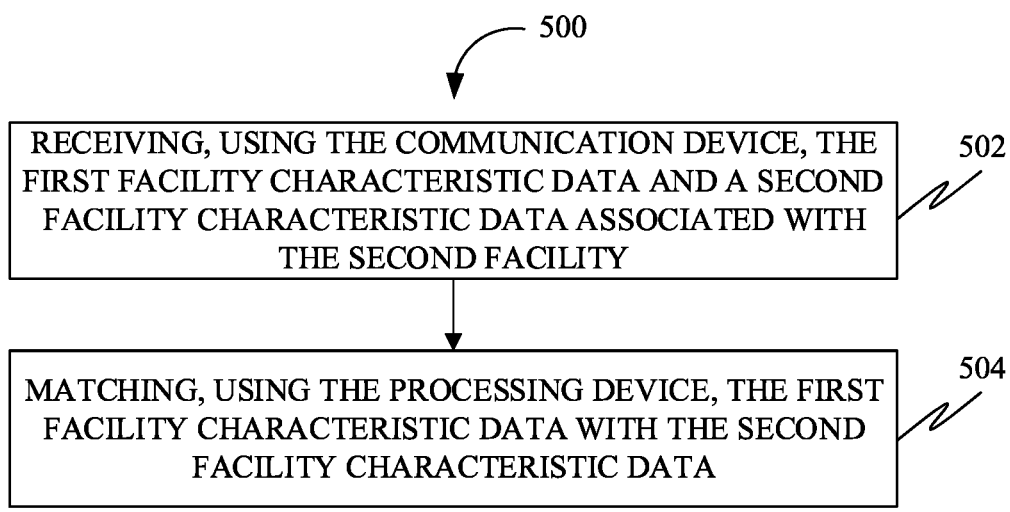
FIG. 5 is a flowchart of a method to facilitate relating characteristic data of the first facility and the second facility, in accordance with further embodiments.

In further embodiments, the facility may include a first facility and a second facility. The first facility and the second facility, in an instance, may be two different facilities that may be located at different locations. Further, the historical data corresponds to the first facility associated with a first facility characteristic data. The first facility characteristic data, in an instance, may be any data that may reflect features associated with the first facility. For instance, the first facility characteristic data may include data such as (but not limited to) time associated with the opening and/or closing of doors at the first facility etc. Accordingly, FIG. 5 is a flowchart of a method 500 to facilitate relating characteristic data of the first facility and the second facility, in accordance with further embodiments.

Further, at 502, the method 500 may include receiving, using the communication device, the first facility characteristic data and a second facility characteristic data associated with the second facility. The second facility characteristic data, in an instance, may be any data that may reflect features associated with the second facility. For instance, the second facility characteristic data may include data such as (but not limited to) time associated with the opening and/or closing of doors at the second facility etc.

Further, at 504, the method 500 may include matching, using the processing device, the first facility characteristic data with the second facility characteristic data. Further, the generating of the recommended configuration data may be based on the matching.

Further, in some embodiments, the at least one sensor may include at least one facility characteristic sensor configured for sensing one or more of the first facility characteristic data and the second facility characteristic data. The at least one facility characteristic sensor, in an instance, may include a sensor such as (but not limited to) a temperature sensor, a pressure sensor, a camera sensor, a location sensor, a humidity sensor etc.

Figure 6:
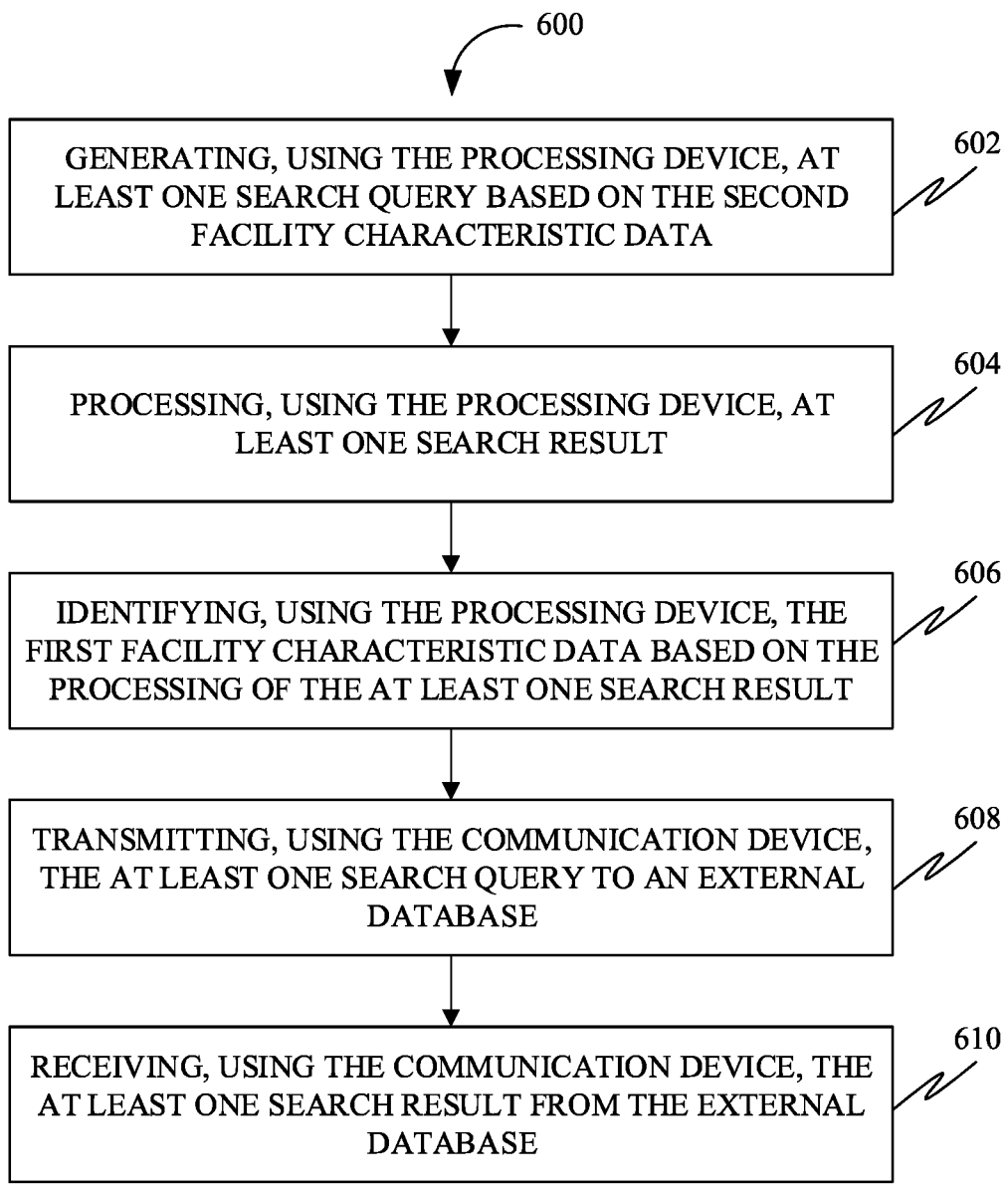
FIG. 6 is a flowchart of a method to facilitate providing at least one search query based on the second facility characteristic data, in accordance with further embodiments.

In further embodiments, the recommendation request may include the second facility characteristic data. Accordingly, FIG. 6 is a flowchart of a method 600 to facilitate providing at least one search query based on the second facility characteristic data, in accordance with further embodiments. Further, at 602, the method 600 may include generating, using the processing device, at least one search query based on the second facility characteristic data. The at least one search query, in an instance, may be any inquiry and/or question that may be asked by the user through the user device. Further, at 604, the method 600 may include processing, using the processing device, at least one search result. Further, the at least one search result, in an instance, may be a response associated with the at least one search query. Further, at 606, the method 600 may include identifying, using the processing device, the first facility characteristic data based on the processing of the at least one search result. Further, the generating of the recommended configuration data may be based on the at least one search result. Further, at 608, the method 600 may include transmitting, using the communication device, the at least one search query to an external database. Further, the external database, in an instance, may be any storage space that may be configured to store the at least one search result in an organized form that may be accessed electronically. Further, at 610, the method 600 may include receiving, using the communication device, the at least one search result from the external database.

Figure 7:
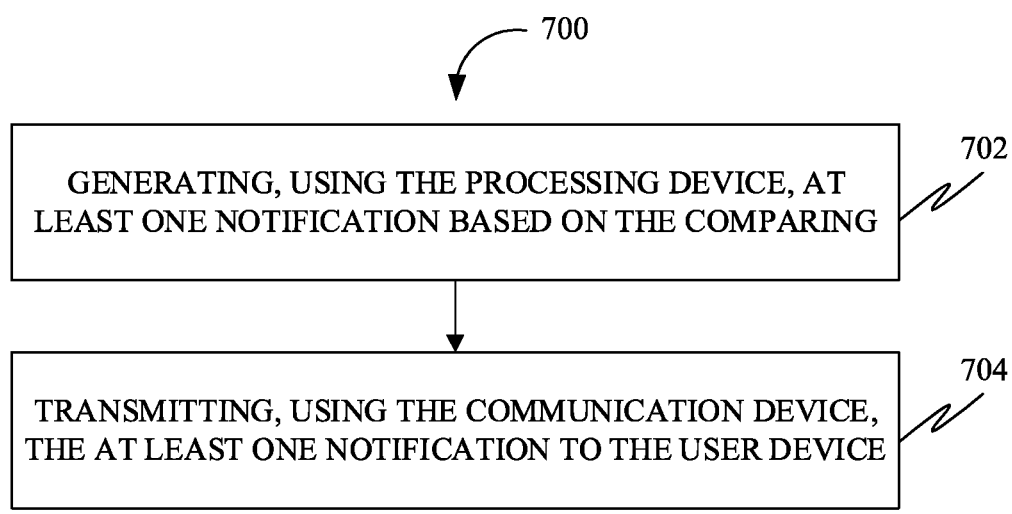
FIG. 7 is a flowchart of a method to facilitate providing at least one notification, in accordance with further embodiments.

In further embodiments, the at least one sensor may include at least one door sensor associated with the at least one door. Further, a door sensor associated with a door may be configured for sensing a state of the door. The door sensor, in an instance, may include sensor devices such as (but not limited to) a position sensor, a motion sensor, a light sensor, an infra-red sensor, an ultrasonic sensor etc. associated with the door. Accordingly, FIG. 7 is a flowchart of a method 700 to facilitate providing at least one notification, in accordance with further embodiments. Further, at 702, the method 700 may include generating, using the processing device, at least one notification based on the comparing. The at least one notification, in an instance, may be an alert that may be given to the user through the user device. Further, the at least one notification, in an instance, may include (but not limited to) an email, and/or a message that may be used to alert the user based on the comparing. Further, at 704, the method 700 may include transmitting, using the communication device, the at least one notification to the user device. In an instance, the user may receive the at least one notification through the user device if a status (such as a door open status, and/or a door closed status) of a door or additional mechanism is against a pre-set parameter and/or condition. For instance, if the user sets the doors of a commercial facility to be open after 8 am, and a door remains closed, a notification may be sent to the user device notifying the user of the same.

In further embodiments, the configuration data further may include a buffer time indication. Accordingly, the user may set the buffer time indication for which the status of the door or additional mechanisms may be monitored before sending the at least one notification. Further, the generating of the at least one notification may be based on the buffer time indication. Further, the at least one sensor data associated with the at least one door sensor corresponds to the buffer time. For instance, if the doors of a commercial facility remain closed even after the user has set the doors to be open, the status of the closed doors may be monitored for 5 minutes before a notification is sent to the user device.

Figure 8:
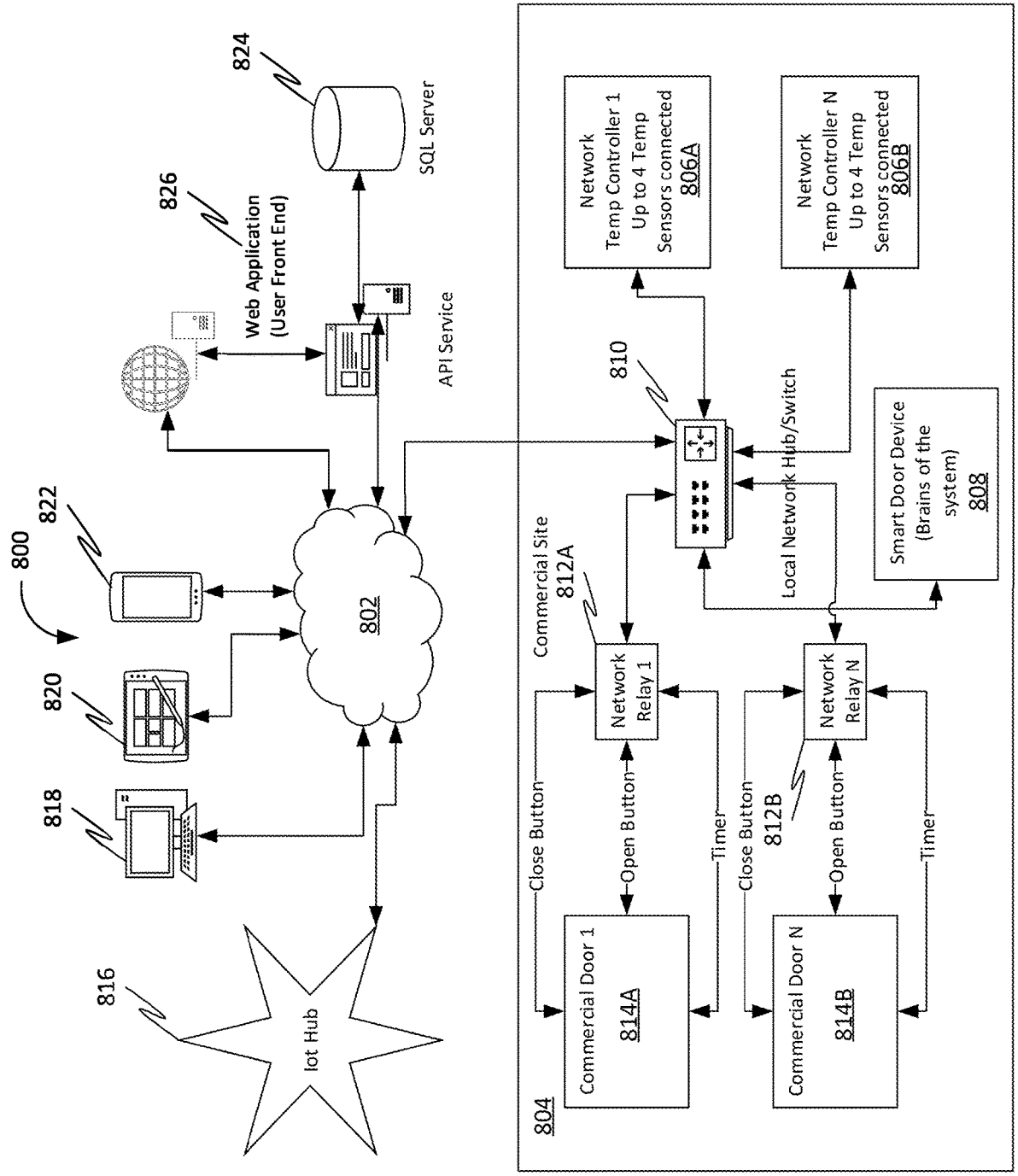
FIG. 8 is an illustration of an exemplary online platform, consistent with various embodiments of the present disclosure, in accordance with some embodiments.

FIG. 8 is an illustration of an exemplary online platform 800, consistent with various embodiments of the present disclosure, in accordance with some embodiments. The online platform 800 for facilitation of management of a facility that may include automation of opening and closing of doors (such as commercial door 814A, and 814B, as shown in FIG. 8) in commercial facilities may be hosted on a centralized server 802.

The centralized server 802 may be, but may not be limited to a cloud computing service. The centralized server 802 may communicate with other network entities. The network entities may include mobile devices 822, other electronic devices (such as desktop computers 818, server computers 820, SQL server 824 etc.), IoT Hub 816, databases, sensors, and actuators, over a communication network. Further, the online platform 800 may communicate with electronic devices operated by users of the online platform 800. A user may access the online platform 800 through a web based software application or browser 826.

Further, the online platform 800 may be configured to communicate with a system 804 to facilitate the automation of opening and closing of doors (such as commercial door 814A, and 814B) in commercial facilities. The opening and closing of doors may be performed when certain parameters may have been fulfilled or certain conditions may have been met. The conditions or parameters may have been set by a user through the user device. The online platform 800 to facilitate the opening and closing of doors may be called by any name. In an instance, the system 804 may be named as Smart Door Controls. Further, the system 804 may be used in any commercial facility. In an exemplary embodiment, the system 804 may be used in a car wash to control and automate the opening and closing of doors and control additionally connected mechanisms such as the mechanisms and devices that may be used to wash cars.

Figure 10:
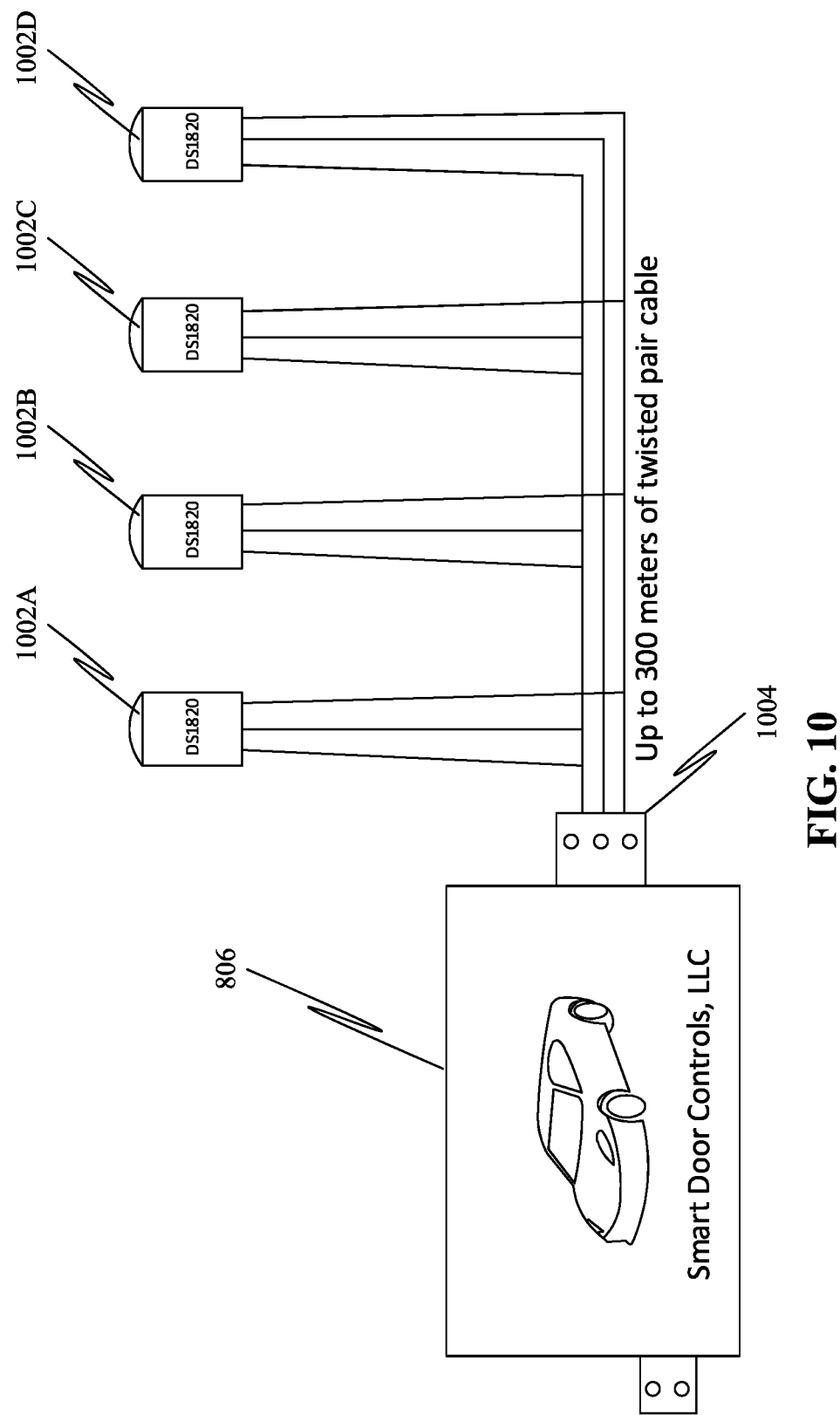
FIG. 10 shows an exemplary circuit diagram of the temperature sensors connected to the temperature controller, in accordance with further embodiments.
Figure 11:
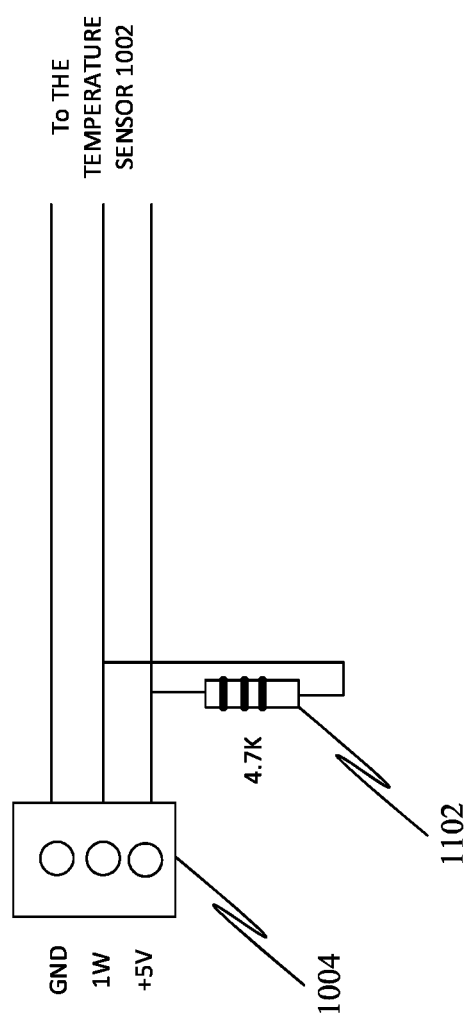
FIG. 11 shows an exemplary wiring mechanism with a resistor that may be used if the temperature sensor does not provide accurate readings, in accordance with further embodiments.
Figure 12:
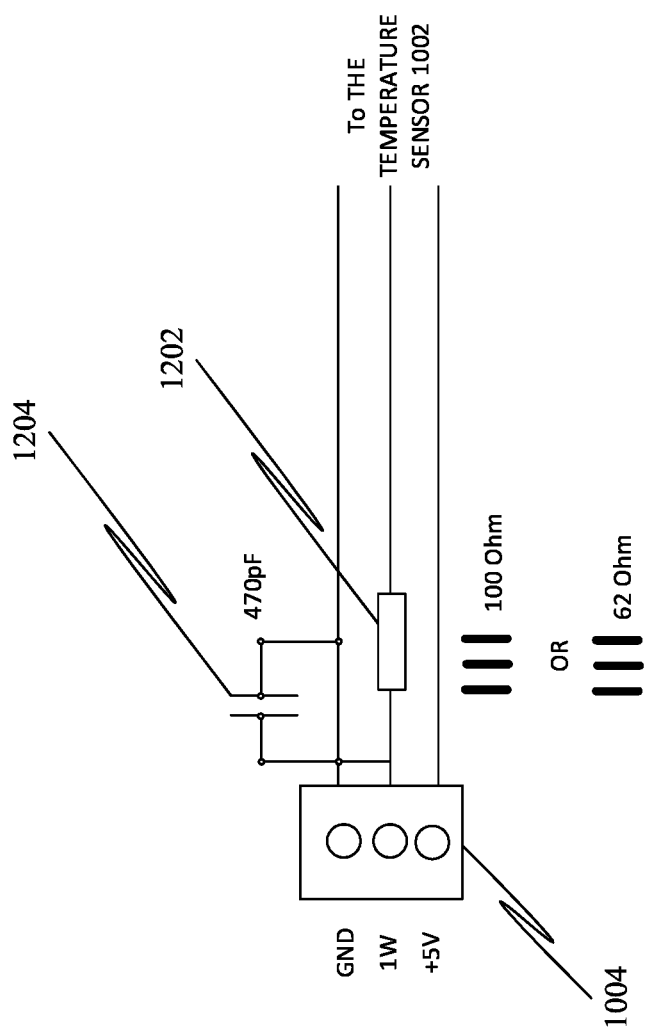
FIG. 12 shows an exemplary wiring mechanism with a resistor and a capacitor that may be used if the temperature sensor does not provide accurate readings, in accordance with further embodiments.

The system 804 to facilitate the automation of opening of doors in commercial facilities may include multiple sensors, and sensor controllers to gauge and sense the external parameters set by the user to automate the opening and closing of doors. For instance, the user may set the doors of the commercial facility to close automatically below a certain temperature. Therefore, the system 804 may include multiple network temperature controllers 806A and 806B that may communicate with temperature sensors 1002A, 1002B, 1002C, and 1002D, as shown in FIG. 10). In an instance, four temperature sensors 1002A-D may be connected to each temperature controller 806A and 806B through a three pin connector 1004 (as shown in FIG. 10). FIG. 10 shows an exemplary circuit diagram of the temperature sensors 1002A-D connected to the temperature controllers 806A. In an embodiment, the temperature sensors 1002A-D may be connected to the temperature controller 806A through the three pin connector 1004 in a particular manner (such as in parallel). Each temperature sensor 1002A-D may include a 1-meter cable that may be extended by using additional cable. For instance, Cat 5E cable may be used to extend the cable connected to each temperature sensor 1002A-D. Each temperature sensor 1002A-D may be located anywhere in the commercial facility close enough to a power outlet. Further, an additional wiring mechanism, as shown in FIG. 11 and FIG. 12, may be used if the temperature sensors 1002A-D do not provide accurate readings. FIG. 11 shows an exemplary wiring mechanism with a resistor 1102 that may be used if the temperature sensor 1002A does not provide accurate readings. Further, the resistor 1102, in an instance, may be configured to have a resistance of 4.7 kilo-ohms. Further, FIG. 12 shows an exemplary wiring mechanism with a resistor 1202 and a capacitor 1204 that may be used if the temperature sensor 1002A does not provide accurate readings. Further, the resistor 1202, in an instance, may be configured to have a resistance of either 100 ohms or 62 ohms. Further, the capacitor 1204, in an instance, may have a capacitance of 470 pF (pico-Farad).

Further, the system 804 may include a processing device 808 that may process inputs received by the sensors, and control the opening and closing of doors. In an exemplary embodiment, the processing device 808 may be called Smart Door Device. The processing device 808 may be a computer and may be connected to a UPS to ensure that that the processing device 808 remains powered on and has a continuous source of unfluctuating power. The processing device 808 may be located anywhere in the commercial facility. The processing device 808 may only need a power source, and a network cable to use. Further, the system 804 may include a local network hub and/or switch 810 that may be used to control the opening and closing of doors. Further, the system 804 may include multiple network relays (such as network relay 812A and 812B, as shown in FIG. 8) that may be in communication with multiple switches to open and/or close the doors of the commercial facility. Further, the network relays 812A-B may also be in communication with timer 910 (as shown in FIG. 9) that may be used to automate the opening and closing of doors and to gauge the time for which the doors may be open or closed.

Figure 9:
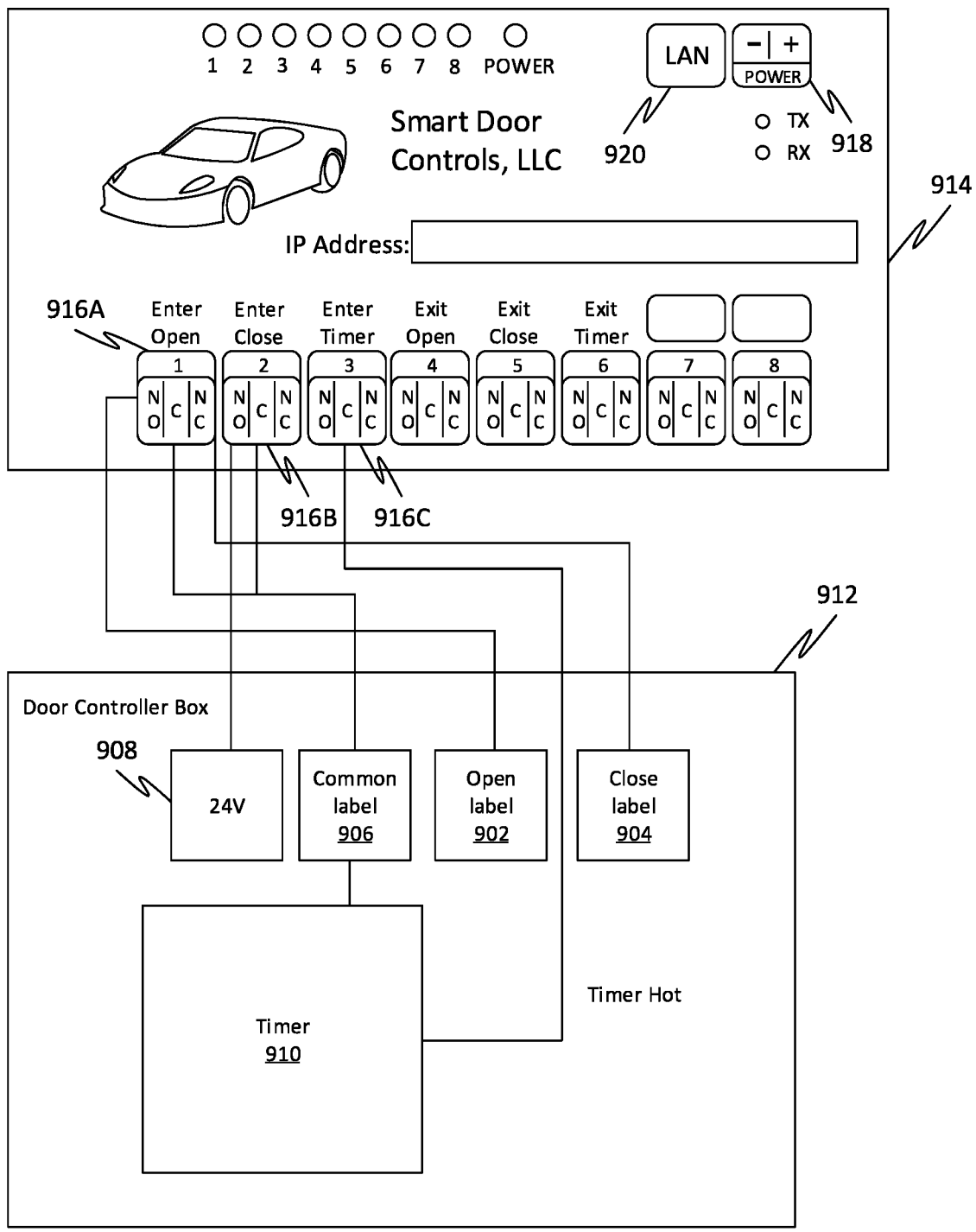
FIG. 9 shows an exemplary diagram to facilitate wiring an open and close button to a relay, as well as a timer that may be installed on a typical commercial door, in accordance with further embodiments.

FIG. 9 shows an exemplary diagram to facilitate wiring an open and close button to a relay, as well as a timer that may be installed on a typical commercial door, in accordance with further embodiments. The user may wire an open label 902, close label 904, the timer 910 for a single device, or mechanism, or a door in accordance with a wiring diagram as shown in FIG. 9. A relay controller 914 may be powered by an internal door 24V transformer 908. Further, the relay controller 914, in an instance, may include a plurality of relays (such as relay 916A, 916B, and/or 916C). Further, each relay (such as the relay 916A) of the plurality of relays, in an instance, may include three terminals such as NO (Normally open), NC (Normally closed), and C (common). Further, the NO on the relay 916A (Enter Open) may be wired to the Open label 902 on the door controller 912. The C on the relay 916A (Enter Open) may be wired to the common label 906 on the door controller 912. The NO on the relay 916B (Enter Close) may be wired to the Close label 904 on the door controller 912. The C on the relay 916B (Enter Close) may be wired to the common label 906 on the door controller 912. The NO of the relay 916C (Enter Timer) may be wired to the 24V on the door Controller 912. The C of the relay 916C (Enter Timer) may be wired to the 24V Hot on a timer plug. The user may remove the existing Hot (24V) wire that may run to the timer 910, if the timer 910 may not be turned off due to a lack of the switch. Alternatively, if switches to turn timers off and on are installed, the switches may always be in the off position. A wire may be connected from the 24 v to a positive terminal (+) of a power 918. A wire may be connected from common to negative terminal (−) of the power 918 to power the plurality of relays. A standard Cat 5e network cable may be connected to a LAN port 920 of the relay controller 914, and into a local network switch.

Further, the methods and systems disclosed herein may include various user interfaces of a web based software application that a user may use to configure the Smart Doors Controls system (such as the system 804).

A user may register on a Smart Door Controls Platform and control the doors, and additional mechanisms of the car wash. The system 804 may allow the user to customize the hours of operation, and provide hints on how to wire the system 804 to control the doors and other mechanisms devices. The electric components may be configured prior to the installation of the system 804. The user may configure to include and power the system 804 using a UPS system to ensure that the system 804 continues to run in the case of a power outage. The user may sign in using an email id and may see a dialog box in which the user may fill up details. Further, the user may choose to register on the online platform 800. Accordingly, the user may fill up the details in a form. The user may enter an email address and/or other information on the form, and click on Send verification code to the email address to validate the filled email address. Upon entering the verification code and pressing verify code to validate the entered email address, the user may press Create at the bottom of the form. Further, the user may need to agree to an end user license agreement to use the online platform 800 and system 804. The user may see a see a form after validation of email address to agree with the end user license agreement. The user may click on "I agree" to signify agreement with the terms and conditions to use the online platform 800 and system 804.

Further, upon agreement with the end user license agreement, the user may proceed with the configuration of the commercial facility. Once logged into the system 804, the user may create the site that may represent the commercial facility. The user may see an online form and may fill up the form with relevant details. The user may add relevant devices and/or sensors. The user may click on "Add Site" to enter information about the commercial facility where the system 804 may be installed. Device ID may display a unique id label on the Smart Door Device (such as the processing device 808). The user may enter the name of the commercial facility in Site Name. For instance, the user may enter the name "The Farmington Car Wash".

Further, the user interface may include "Enable Auto Site Open". Further, the "Enable Auto Site Open" may allow the commercial facility to open automatically at a specific time. Site Open Time may be the time at which the system 804 may unlock the commercial facility.

Further, the user interface may include "Enable Auto Site Close," that may allow the commercial facility to close automatically at a specific time. Site Close Time may be the time at which the system 804 may lock the commercial facility.

Further, the user interface may include "Enable Door Close," that may allow the system to turn on the timer 910 and periodically close doors if the temperature gets below a preset level.

Further, the user interface may include "Door Close Temp," that may be the temperature at which the system 804 may turn on the timer 910 and start closing the configured doors. For instance, entering a value of 52 would keep the doors closed once the outside temperature is at or below 52 degrees Fahrenheit.

Further, the user interface may include "Auto Close Delay," that may be the delay in minutes between the times when the system 804 may automatically try to close a door set with Use in Auto Close. The system 804 may automatically pulse doors at this interval.

Further, the user interface may include "Time Zone," that may be the time zone of the location of the commercial facility. Further, "Zip code" may be the zip code of the commercial facility. After entering all relevant information, the user may click on "Create". The user may make changes to the site at any time, and the changes may be transmitted automatically to the Smart Door Device (such as the processing device 808). The user may also delete a site along with all the settings. Further, the user may also shut down, or restart the system 804 through the online platform 800.

Further, the user may add sensors to the system 804. The sensors may include a wind speed sensor, a humidity sensor, and so on. In an exemplary embodiment, the sensors may be temperature sensors (such as the temperature sensors 1002A-D, as shown in FIG. 10). Temperature sensors 1002A-D may display the current temperatures at the site. Further, additional temperature sensors 1002A-D may be required to display the outside temperature and have the system 804 automatically close the doors and enable the door timers (such as the timer 910). The sensors may be placed anywhere in the commercial facility. The user may add the temperature sensors 1002A-D to the system 804 through the online platform 800. The user may add the temperature sensors 1002 A-D through a form using the user interface. The user may press "Manage Temp Sensors" from a Site Configuration screen of the user interface, and press "Add Temp Sensor" to add a temperature sensor 1002A and enter a sensor id as labeled on each sensor. The user may also associate a human-readable name with the sensor id of the sensor that may be visible on the main devices page of the user interface. Further, the user may press "Create" after entering the required information. Further, the user interface may show an "IP Address," that may be a network address of the temperature controller 806A and may be labeled on the top the temperature controller 806A. The default address of the temperature controller 806A may be 192.168.1.200.

Further, the user interface may include "Temp Sensor X Id," that may be the id of a temperature sensor (such as the temperature sensor 1002A, as shown in FIG. 10). Each temperature controller 806A and 806B may allow up to 4 temperature sensors 1002A-D to be connected. The Id may be matched to the name given in a "Temp Sensor X Name" field of the user interface.

Further, the "Temp Sensor X Name" may be the name associated with the ID of the temperature sensor (such as the temperature sensor 1002A). The name of the temperature sensor may be modified. Further, the user may modify, and delete the information related to the sensors from the relevant option in the user interface.

The user may update the information associated with the commercial facility. The user may choose to add a sensor, such as a temperature sensor 1002A to the commercial facility. The user may add a temperature sensor (such as the temperature sensor 1002A) from the relevant options in the user interface. For instance, the user may add values in a relevant form of the user interface. Further, the user may press "Site Configuration" from the main menu of the user interface and then press "Edit" next to the site to be modified. The user may select the temperature sensor (such as the temperature sensor 1002A) that may have been installed outside the commercial facility from the appropriate drop-down menu of the user interface. Accordingly, the user may press "Save" in the user interface to save the selection and return to the Site Configuration screen.

After the configuration of the system 804 for the commercial facility site and the addition of controllers and sensors, the user may add devices that may include doors open, close and timer buttons. The user may also control additional mechanisms. The user may add each door open, close, timer button manually, or may use the "Set up Default Doors" link to have the system 804 generate the proper configuration for each of the devices wired into the system 804. After setting "defaults" through the user interface, the user may edit the default settings for all devices.

Further, when the system 804 is initially configured for a commercial facility, and no devices are configured, the link to Set up Default Doors may be available. The user may press "Site Configuration" from the main menu of the user interface and then press "Manage Devices." An additional optional page may appear in the user interface and the user may press "Set up Default Doors" to go to a new device set up page Accordingly, an additional form may open that may allow the user to create all open, close, timer device settings for all devices. For instance, if the commercial facility is a car wash, and has multiple bays, the user may add the number of bays to be set up. For e.g., if the user has a 4-bay self-serve, and each bay has an enter and an exit door, the user may enter "4". This may create an open, close, timer for each bay, starting with bay 1, and ending with bay 4. After entering the information on the page of the user interface, the user may press "Create Defaults" to create all device configuration defauls for your system 804. Alternatively, the user may press "Back to Manage Devices" on the user interface to cancel the creation of default devices. Further, if the user clicks on the lock enter doors close buttons on site close if the user enables the site close feature, or if the user may want the system 804 to automatically close at night and open in the morning. This option may set the Lock Device at Site Close Time for the entry doors only. The user may make changes to any of the defaults created.

Further, the user may add devices manually using the user interface. The user may press "site configuration" from the main menu of the user interface and then, from the page displayed, press "Manage Devices". A form may appear to the user on the user interface. The user may press "Add Device" to add a new device to the system 804 and press "Create" after adding all information to a device.

Further, a "Relay Number" in the user interface may be the relay number wired to the device that the user may be configuring.

Further, a "Name" in the user interface may relate to the name of the device wired into the relay.

Further, an "IP Address" in the user interface may be the network address of the Relay controller that may be wired to the device that the user may need to control.

Further, a "Device Type" in the user interface may provide information about the mechanism connected to the relay.

Further, a "Close Button" in the user interface may be used if the device is connected to the close button on a door.

Further, an "Open Button" in the user interface may be used if the device is connected to the open button on a door.

Further, "Timer" in the user interface may be used if the device is connected to a timer for a door.

Further, "Other" in the user interface may be used for any other device connected to the system.

Further, use in "Auto Close" in the user interface may be used to automatically close the door for preset parameters.

Further, "Lock Device at Site Close Time" in the user interface may be selected if the user intends to lock the device "ON" when the site close time for the commercial facility may be enabled, and unlock the device when the site open time for the commercial facility may be enabled. Further, the user may make changes to any added devices, including editing, viewing, deleting a device. Further, the user may make the changes by selecting the appropriate options from the user interface.

Further, a default start page of the user interface may show all devices associated with toggle controls. The default start page may also show a status associated with devices and along with the data from the connected sensors. The user may press "Devices" from the main menu of the user interface to go to the "Devices page". The Devices page may list all devices grouped by site. Further, the reading from connected sensors may also be shown along with the listed devices. Further, the user may toggle a device, or turn the device on or off. The user may also lock and/or unlock devices.

Further, the user may create alerts (through the user interface) that may be related to the preset parameters. For instance, if the sensors are temperature sensors (such as the temperature sensors 1002A-D), the user may create temperature alerts. A user may create alerts for all temperature installed. The alert may be an email, or a notification on a connected user device, about the temperature not being in the defined limits. A user may add temperature alerts by pressing "Site Configuration" from the main menu of the user interface. A Site Configuration page on the user interface may appear. The user may press "Manage Temp Alerts" and then select "Add Temp Alert" to add a new temperature alert. The user may then press "Create" to save the changes through the user interface. A form, in an instance, may appear. The user may select the name of the temperature sensor (such as the temperature sensor 1002A) from which the user may want to receive an alert from a drop-down menu from a "Temp Sensor" option. The user may add the email address on which the user may wish to receive an email alert. Further, the user, in an instance, may add multiple email addresses on the user interface. The user may then input an "Alert Temperature" and click on "Send When Below Alert Temp" or "not" depending on whether the user may want to receive an alert if the temperature is below the specified temperature, or above. Further, the user may make changes or remove any alerts created at any time by interacting with the user interface. The user may press "Site Configuration" from the main menu of the user interface, and select "Manage Temp Alerts". A dialog box, in an instance, may appear. Further, the user may press "Edit" to edit an alert, "details" to view details of an alert, or "delete" to remove an alert from the available alerts using the user interface. The user may then press "Save" to save the changes (if editing) or "Back To List" to cancel the changes.

Figure 13:
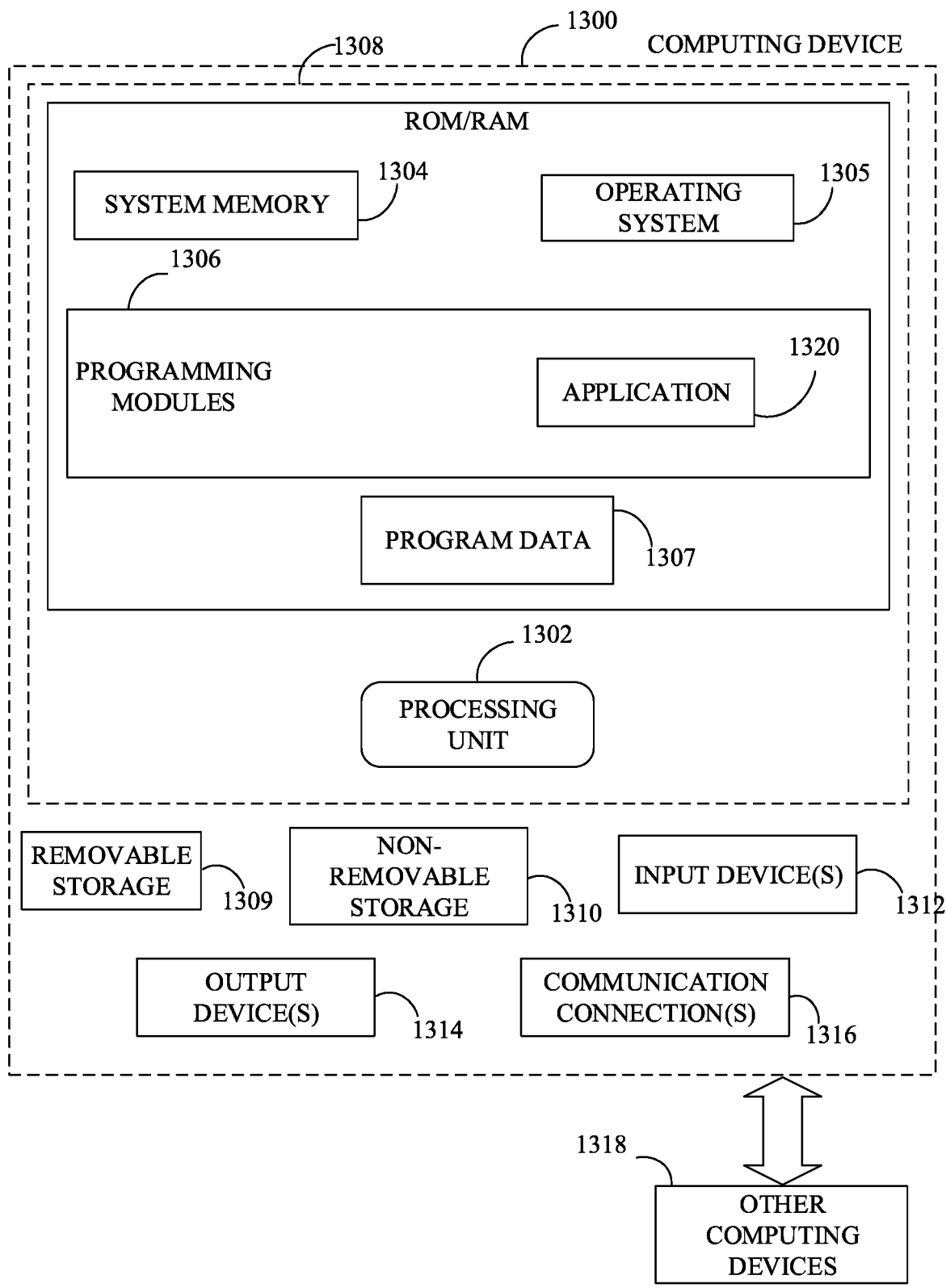
FIG. 13 is a block diagram of a computing device for implementing the methods disclosed herein, in accordance with some embodiments.

With reference to FIG. 13, a system consistent with an embodiment of the disclosure may include a computing device or cloud service, such as computing device 1300. In a basic configuration, computing device 1300 may include at least one processing unit 1302 and a system memory 1304. Depending on the configuration and type of computing device, system memory 1304 may comprise, but is not limited to, volatile (e.g. random-access memory (RAM)), non-volatile (e.g. read-only memory (ROM)), flash memory, or any combination. System memory 1304 may include operating system 1305, one or more programming modules 1306, and may include a program data 1307. Operating system 1305, for example, may be suitable for controlling computing device 1300's operation. In one embodiment, programming modules 1306 may include image-processing module, machine learning module. Furthermore, embodiments of the disclosure may be practiced in conjunction with a graphics library, other operating systems, or any other application program and is not limited to any particular application or system. This basic configuration is illustrated in FIG. 13 by those components within a dashed line 1308.

Computing device 1300 may have additional features or functionality. For example, computing device 1300 may also include additional data storage devices (removable and/or non-removable) such as, for example, magnetic disks, optical disks, or tape. Such additional storage is illustrated in FIG. 13 by a removable storage 1309 and a non-removable storage 1310. Computer storage media may include volatile and non-volatile, removable and non-removable media implemented in any method or technology for storage of information, such as computer-readable instructions, data structures, program modules, or other data. System memory 1304, removable storage 1309, and non-removable storage 1310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1300. Any such computer storage media may be part of device 1300. Computing device 1300 may also have input device(s) 1312 such as a keyboard, a mouse, a pen, a sound input device, a touch input device, a location sensor, a camera, a biometric sensor, etc. Output device(s) 1314 such as a display, speakers, a printer, etc. may also be included. The aforementioned devices are examples and others may be used.

Computing device 1300 may also contain a communication connection 1316 that may allow device 1300 to communicate with other computing devices 1318, such as over a network in a distributed computing environment, for example, an intranet or the Internet. Communication connection 1316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1304, including operating system 1305. While executing on processing unit 1302, programming modules 1306 (e.g., application 1320 such as a media player) may perform processes including, for example, one or more stages of methods, algorithms, systems, applications, servers, databases as described above. The aforementioned process is an example, and processing unit 1302 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A system to facilitate management of a facility, the system comprising:
    a communication device configured for:
        receiving at least one sensor data from at least one sensor corresponding to at least one door of the facility, wherein the at least one door is configured to control physical access to the facility based on at least one state of the at least one door, wherein the at least one state comprises one of an open state and a closed state;
        transmitting at least one actuation data to at least one actuator corresponding to the at least one door, wherein the at least one actuator is configured to control the at least one state;
        receiving at least one configuration data from a user device, wherein the configuration data comprises indication of at least one contextual condition and at least one action corresponding to the at least one contextual condition;
    a processing device configured for:
    analyzing the at least one sensor data to determine a current contextual data;
    comparing the current contextual data with the configuration data;
    generating the at least one actuation data based on the comparing;
    a storage device configured to store the configuration data;
    wherein the storage device is configured to store historical data comprising the at least one sensor data corresponding to a first time period and at least one state data associated with the at least one door corresponding to the first time period, wherein the processing device is configured for:
    analyzing the historical data; and
    generating recommended configuration data based on the analyzing of the historical data, wherein the communication device is further configured for:
    receiving a recommendation request from the user device; and
    transmitting the recommended configuration data to the user device based on the recommendation request, wherein the recommended configuration data comprises the configuration data, wherein the current contextual data is based on the at least one sensor data corresponding to a second time period, wherein the second time period is later than the first time period;
    wherein the facility comprises a first facility and a second facility, wherein the historical data corresponds to the first facility associated with a first facility characteristic data, wherein the communication device is further configured for receiving the first facility characteristic data and a second facility characteristic data associated with the second facility, wherein the processing device is further configured for matching the first facility characteristic data with the second facility characteristic data, wherein the generating of the recommended configuration data is based further on the matching.

2. The system of claim 1, wherein the facility comprises at least one equipment, wherein the at least one actuator is further configured to control an operational state of the at least one equipment, wherein the at least one action corresponds to controlling the operational state of the at least one equipment.

3. The system of claim 2, wherein the at least one sensor comprises at least one equipment sensor associated with the at least one equipment, wherein an equipment sensor associated with an equipment is configured for sensing an operational state of the equipment.

4. The system of claim 1, wherein the at least one sensor comprises at least one facility characteristic sensor configured for sensing at least one of the first facility characteristic data and the second facility characteristic data.

5. The system of claim 1, wherein the recommendation request comprises the second facility characteristic data, wherein the processing device is further configured for:
    generating at least one search query based on the second facility characteristic data;
    processing at least one search result; and
    identifying the first facility characteristic data based on the processing of the at least one search result, wherein the generating of the recommended configuration data is based further on the at least one search result, wherein the communication device is configured for:
        transmitting the at least one search query to an external database; and
        receiving the at least one search result from the external database.

6. The system of claim 1, wherein the at least one sensor comprises at least one door sensor associated with the at least one door, wherein a door sensor associated with a door is configured for sensing a state of the door, wherein the processing device is configured for generating at least one notification based on the comparing, wherein the communication device is configured for transmitting the at least one notification to the user device.

7. The system of claim 1, wherein the configuration data further comprises a buffer time indication, wherein the processing device is configured for generating the at least one notification based further on the buffer time indication, wherein the at least one sensor data associated with the at least one door sensor corresponds to the buffer time.

8. The system of claim 1, wherein the at least one sensor comprises a user characteristic sensor configured for sensing at least one user characteristic data of at least one user of the facility, wherein the indication of the at least one contextual condition comprises the at least one user characteristic data.

9. A method to facilitate management of a facility, the method comprising:
    receiving, using a communication device, at least one sensor data from at least one sensor corresponding to at least one door of the facility, wherein the at least one door is configured to control physical access to the facility based on at least one state of the at least one door, wherein the at least one state comprises one of an open state and a closed state;

transmitting, using the communication device, at least one actuation data to at least one actuator corresponding to the at least one door, wherein the at least one actuator is configured to control the at least one state;

receiving, using the communication device, at least one configuration data from a user device, wherein the configuration data comprises indication of at least one contextual condition and at least one action corresponding to the at least one contextual condition;

analyzing, using a processing device, the at least one sensor data to determine a current contextual data;

comparing, using the processing device, the current contextual data with the configuration data;

generating, using the processing device, the at least one actuation data based on the comparing;

storing, using a storage device, the configuration data;

wherein the storing comprises storing historical data comprising the at least one sensor data corresponding to a first time period and at least one state data associated with the at least one door corresponding to the first time period, wherein the method further comprises:

analyzing, using the processing device, the historical data; and generating, using the processing device, recommended configuration data based on the analyzing of the historical data;

receiving, using the communication device, a recommendation request from the user device; and transmitting, using the communication device, the recommended configuration data to the user device based on the recommendation request, wherein the recommended configuration data comprises the configuration data, wherein the current contextual data is based on the at least one sensor data corresponding to a second time period, wherein the second time period is later than the first time period;

wherein the facility comprises a first facility and a second facility, wherein the historical data corresponds to the first facility associated with a first facility characteristic data, wherein the method further comprises:

receiving, using the communication device, the first facility characteristic data and a second facility characteristic data associated with the second facility; and matching, using the processing device, the first facility characteristic data with the second facility characteristic data, wherein the generating of the recommended configuration data is based further on the matching.

10. The method of claim 9, wherein the facility comprises at least one equipment, wherein the at least one actuator is further configured to control an operational state of the at least one equipment, wherein the at least one action corresponds to controlling the operational state of the at least one equipment.

11. The method of claim 10, wherein the at least one sensor comprises at least one equipment sensor associated with the at least one equipment, wherein an equipment sensor associated with an equipment is configured for sensing an operational state of the equipment.

12. The method of claim 9, wherein the at least one sensor comprises at least one facility characteristic sensor configured for sensing at least one of the first facility characteristic data and the second facility characteristic data.

13. The method of claim 9, wherein the recommendation request comprises the second facility characteristic data, wherein the method further comprises:

generating, using the processing device, at least one search query based on the second facility characteristic data;

processing, using the processing device, at least one search result; and identifying, using the processing device, the first facility characteristic data based on the processing of the at least one search result, wherein the generating of the recommended configuration data is based further on the at least one search result;

transmitting, using the communication device, the at least one search query to an external database; and receiving, using the communication device, the at least one search result from the external database.

14. The method of claim 9, wherein the at least one sensor comprises at least one door sensor associated with the at least one door, wherein a door sensor associated with a door is configured for sensing a state of the door, wherein the method further comprises:

generating, using the processing device, at least one notification based on the comparing;

transmitting, using the communication device, the at least one notification to the user device.

15. The method of claim 14, wherein the configuration data further comprises a buffer time indication, wherein the generating of the at least one notification is based further on the buffer time indication, wherein the at least one sensor data associated with the at least one door sensor corresponds to the buffer time.

16. The method of claim 9, wherein the at least one sensor comprises a user characteristic sensor configured for sensing at least one user characteristic data of at least one user of the facility, wherein the indication of the at least one contextual condition comprises the at least one user characteristic data.

\* \* \* \* \*